United States Patent [19]

Furuhashi et al.

[11] Patent Number: 4,855,542
[45] Date of Patent: Aug. 8, 1989

[54] CANCELLING MECHANISM FOR TURNING SIGNAL

[75] Inventors: Kenshi Furuhashi; Hiroyasu Ito; Nobuyuki Enari, all of Aichi, Japan

[73] Assignee: Kabushiki Kaisha Tikai-Rika-Denki-Seisakusho, Niwa, Japan

[21] Appl. No.: 227,140

[22] Filed: Aug. 2, 1988

[30] Foreign Application Priority Data

Aug. 12, 1987 [JP] Japan ............................ 62-123577[U]

[51] Int. Cl.$^4$ ................................................ H01H 3/16
[52] U.S. Cl. .............................. 200/61.27; 200/61.3; 200/61.34; 200/61.35
[58] Field of Search ................. 200/61.27, 61.3, 61.31, 200/61.32, 61.34, 61.35, 61.37, 61.38

[56] References Cited

U.S. PATENT DOCUMENTS

4,036,817  7/1977  Wilkinson ..................... 200/61.27
4,739,131  4/1988  Maeda ........................ 200/61.35 X Primary Examiner—J. R. Scott
Attorney, Agent, or Firm—Sixbey, Friedman, Leedom & Ferguson

[57] ABSTRACT

A cancelling mechanism for a turning signal automatically returns an operation lever which has been operated in order to indicate the turning direction of a vehicle to a neutral position by the rotation of a steering shaft in the direction opposite from that in which the operation lever is operated. The cancelling mechanism includes a bracket for supporting the operation lever. The bracket is rotated from the neutral position to a right turn position or a left turn position by the pivot of the operation lever. The cancelling mechanism also includes a member for transferring to the bracket the rotary force of a cancelling cam rotated by the rotation of the steering shaft in the direction opposite from that in which the bracket is rotated so as to return the bracket to the neutral position. An elastic member is provided between the bracket and the transfer member. In consequence, the durability of the cancelling mechanism is improved.

17 Claims, 6 Drawing Sheets

PRIOR ART

CANCELLING MECHANISM FOR TURNING SIGNAL

BACKGROUND OF THE INVENTION

1. Field of the Invention

The present invention relates to a cancelling mechanism for a turning signal which automatically returns an operation lever operated in order to indicate the turning direction of a vehicle to a neutral position by the turning of a steering shaft in the direction opposite from that in which the operation lever is turned.

2. Description of the Prior Art

Figure 6:
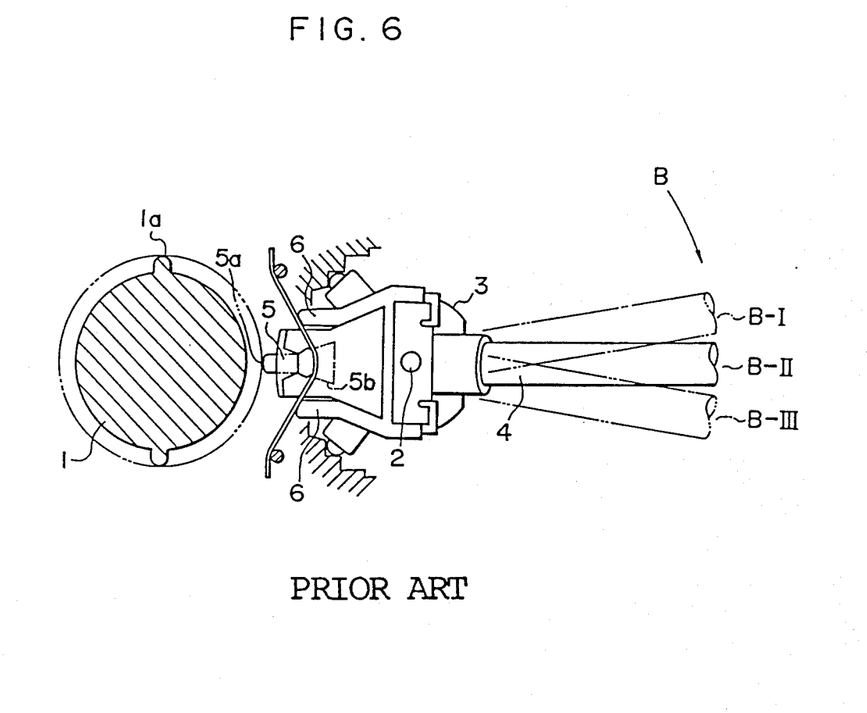
FIG. 6 is a view similar to FIG. 1, showing a known cancelling mechanism.

Cancelling mechanisms for turning signals of the above-described type generally include a bracket formed in such a manner that it surrounds a steering shaft, the bracket being pivotally supported on a base, an operation lever mounted on one side of the bracket, and a ratchet provided at the other side of the bracket, the ratchet serving as the cancelling mechanism. An arrow head "B" in FIG. 6 shows each position of the operating lever 4. When the bracket is displaced by the operation lever to a position which represents a left turn shown by a symbol B-I in FIG. 6 or a right turn shown by a symbol B-III IN FIG. 6, the claw piece of the ratchet is positioned within the locus of the projecting portion of a cancelling cam. The cancelling cam presses the claw piece of the ratchet when it is rotated in the direction opposite from that in which the lever was operated, returning the bracket, and hence the operation lever, to the neutral position shown by a symbol B-II in FIG. 6. However, the above-described cancelling mechanism suffers from a problem in that the size thereof is large due to the structure in which the bracket surrounds the steering shaft.

Accordingly, an improved cancelling mechanism has been proposed in the specification of Japanese Utility Model Laid-Open application No. 57-199146. The structure thereof is shown in the prior art FIG. 6. More specifically, in this cancelling mechanism, a bracket 3 made of a plastic is supported at one side of a steering shaft 1 in such a manner as to be pivotal about a shaft 2. The bracket 3 is pivoted by an operation lever 4 mounted on the side of the bracket 3 opposite from the side which is mounted to the steering shaft 1 between a neutral position and a right turn position or a left turn position. An engaging member 5 is mounted on the side of the bracket 3 which is closer to the steering shaft 1 in such a manner as to be movable. The engaging member 5 has a forward end portion 5a which is directed toward the steering shaft 1. Two engaging arms 6 that can be elastically deformed are also mounted on that side of the bracket 3 in such a manner that they face a proximal end portion 5b of the engaging member 5. When the bracket 3 is pivoted from the neutral position to the right turn position or the left turn position, the forward end portion 5a of the engaging member 5 becomes positioned within a locus of rotation of projecting pieces 1a of the steering shaft 1. In this state, when the steering shaft 1 is rotated in the same direction as that in which the bracket is operated, the proximal end portion 5b of the engaging member 5 is pivoted between the engaging arms 6. On the other hand, when the steering shaft 1 is rotated in the opposite direction, the projecting piece 1a abuts against the forward end portion 5a of the engaging member 5, bringing the proximal end portion 5b thereof into engagement with the engaging arm 6 and thereby returning the bracket 3 to the neutral position.

At this time, if the operation lever 4 is manually locked by a driver, the engaging member 5 which abuts against the projecting piece 1a pivots while elastically deforming the engaging arm 6, enabling the projecting piece 1a to pass the forward end portion 5a.

However, in the above-described cancelling mechanism, since the two engaging arms 6 are made elastically deformable so as to cause the engaging member 5 to pivot when the operation lever 4 is locked, they are also elastically deformed in a normal cancelling operation, generating internal stress. Further, the engaging arms 6 made of a plastic become softened at high temperatures, increasing the amount of deformation. These factors, together with the change with time, result in the poor durability of the engaging arms 6, and therefore of the cancelling mechanism.

SUMMARY OF THE INVENTION

Accordingly, an object of the present invention is to provide a cancelling mechanism for a turning signal which enables the durability thereof to be improved.

To this end, the present invention provides a cancelling mechanism for a turning signal which comprises: a cancelling cam coupled to a steering shaft; a bracket pivoted by an operation lever between a neutral position and a right turn position or a left turn position; a click mechanism for retaining the bracket at the neutral position, the right turn position, and the left turn position; an engaging member mounted on the bracket, the engaging member having a forward end portion positioned within a rotational locus of the cancelling cam when the bracket is pivoted from the neutral position to the right turn position or to the left turn position; a transfer member mounted on the bracket in such a manner as to be movable, the transfer member having projecting portions at the two ends thereof, when the cancelling cam is rotated in the same direction as that in which the bracket is operated in the state wherein the bracket is located at the right turn position or the left turn position, a proximal end portion of the engaging member being pivoted between the projecting portions, while, when the cancelling cam is rotated in the opposite direction, the proximal end portion of the engaging member engaging with either of the projecting portions; and a spring for normally retaining the transfer member at the neutral position and for transferring the moving force of the transfer member to the bracket when the proximal end portion of the engaging member is engaged with either of the projecting portions of the transfer member so as to return the bracket to the neutral position.

In the cancelling mechanism of the present invention, when the bracket is pivoted by the operation lever from the neutral position to the right turn position or the left turn position and is held at that position by the click mechanism, the forward end of the engaging member is positioned within the rotational locus of the cancelling cam. In this state, when the cancelling cam is rotated in the same direction, the proximal end portion of the engaging member is pivoted between the projecting portions of the transfer member, and the bracket is held at that position. On the other hand, when the cancelling cam is rotated in the opposite direction, the proximal end portion of the engaging member is engaged with either of the projecting portions, and the bracket is returned to the neutral position against the retaining force of the click mechanism by the restoring force of the spring to the neutral position. At this time, if the operation lever is locked, the proximal end portion of the engaging member moves the transfer member against the restoring force of the spring through either of the projecting portions, and the cancelling cam thereby pushes past the forward end of the projecting portion.

DESCRIPTION OF THE PREFERRED EMBODIMENTS

The present invention will be described below by way of example with reference to FIGS. 1 to 5 in which the present invention is applied to a left-hand drive automobile which meets the specification required for export.

Figure 1:
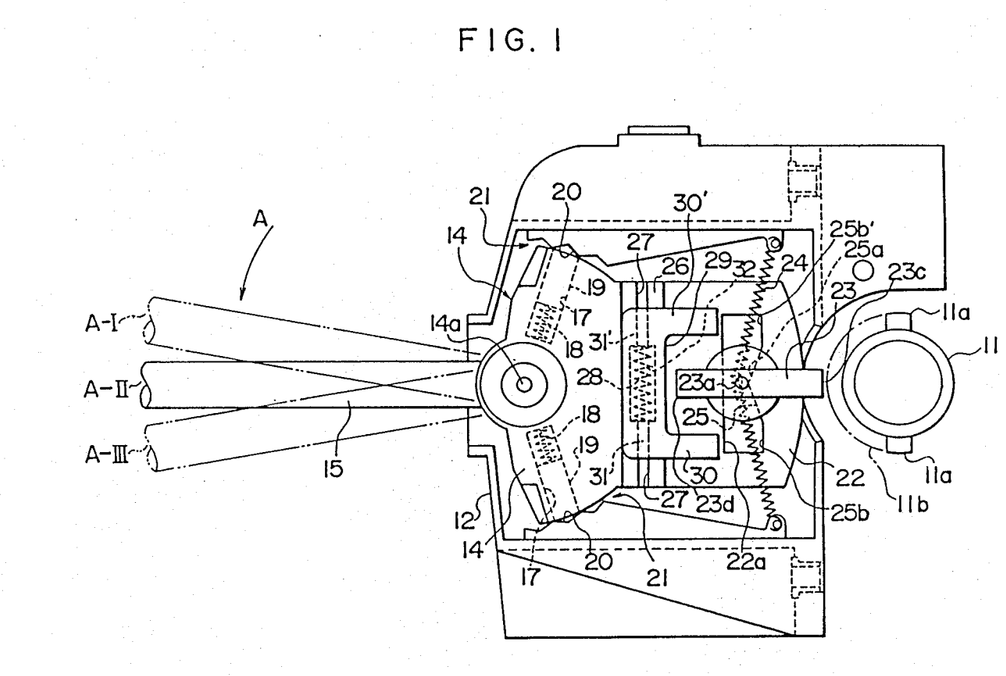
FIG. 1 is a plan view of a cancelling mechanism for a turning signal which is applied to a left-hand drive automobile which meets the specification for export and in a state wherein it is located at a neutral position and wherein a cover is removed, showing an embodiment of the present invention.
Figure 2:
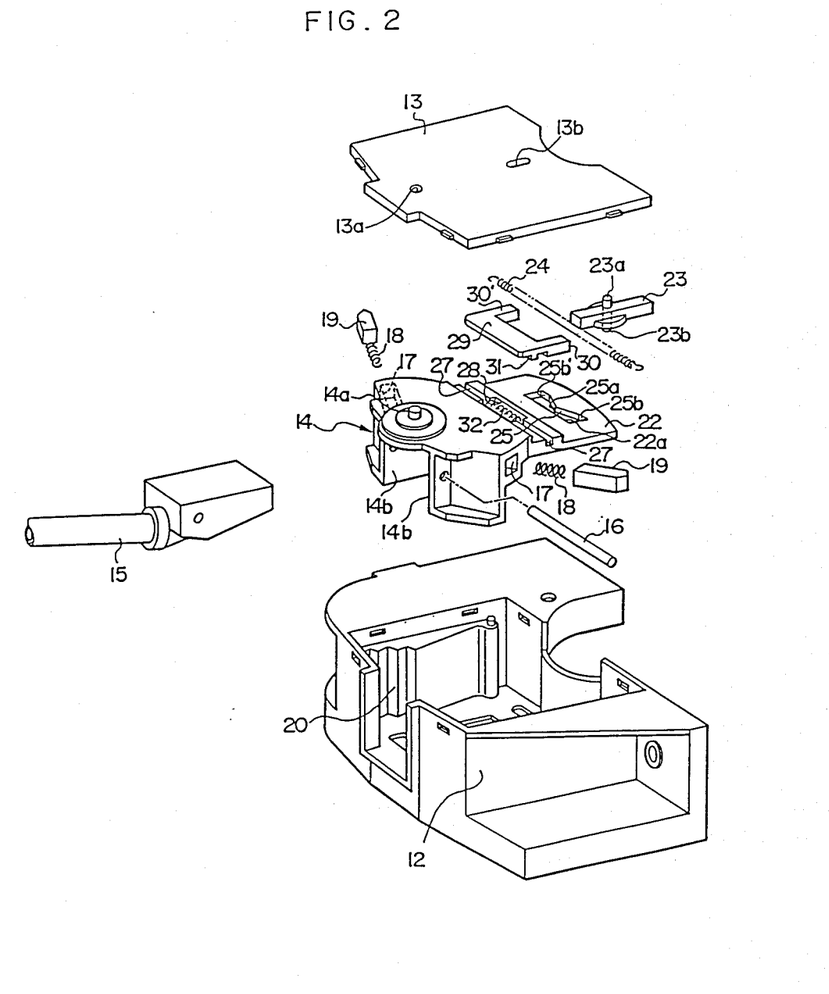
FIG. 2 is a perspective view of the cancelling mechanism of FIG. 1.

Referring first to FIGS. 1 and 2, a cancelling cam 11 coupled to a steering shaft (not shown) has two projecting portions 11a on the outer periphery thereof. A vessel-shaped base 12 is provided around the cancelling cam 11. The upper surface of the base 12 is opened, and a cover 13 is mounted on this opening of the base in such a manner as to close it. A bracket 14 made of a plastic is pivotally accommodated in the base 12. The bracket 14 has a pin 14a on the upper surface thereof, and the pivot of the bracket 14 is achieved by the fitting of the pin 14a into a hole 13a of the cover 13. An operation lever 15 passes through the side wall of the base 12, and the proximal end portion of the operation lever 15 is mounted on leg portions 14b of the bracket 14 by a pin 16. An arrow head "A" in FIG. 1 shows each position of the operating lever 15. The operation lever 15 can be pivoted together with the bracket 14 from a neutral position shown by a symbol A-II in FIG. 1 to a right turn position shown by a symbol A-I in FIG. 1 or a left turn position shown by a symbol A-III in FIG. 1. The bracket 14 has holes 17 at the two side surfaces thereof, and click members 19 which are urged outwardly by springs 18 are respectively inserted into the holes 17. The two side surfaces of the base 12 are provided with irregularities 20, and the click members 19 are fitted to these irregularities 20. The springs 18, the click members 19 and the irregularities 20 in combination constitute click mechanisms 21. A plate-shaped receiving portion 22 is provided in such a manner that it extends from the lower end of the bracket 14 toward the cancelling cam 11. The receiving portion 22 has an elongated hole 22a. An engaging member 23 is placed on the receiving portion 22. The substantially central portion of the engaging member 23 is provided with a pin 23a which is directed upward, and a pin 23b which is directed downward. The pin 23a is inserted into an elongated hole 13b formed in the cover 13 while the pin 23b is inserted into the hole 22a in the receiving portion 22 so as to enable the engaging member 23 to be moved toward the cancelling cam 11 and pivoted. The engaging member 23 is normally urged toward the cancelling cam 11 through the pin 23b by a spring 24 whose two ends are supported on the corners of the base 12. The pin 23b is formed in a semi-circular column having a flat surface and curved surface, and the spring 24 abuts on the flat surface of the pin 23b to urge the engaging member 23. Therefore, the engaging member 23 is urged toward the cancelling cam 11 in the situation shown in FIG. 1. However, when the engaging member 23 in rotated to the situation shown by the dot-dot-dashed line in FIG. 3, it urged in the direction opposite from that indicated by the arrow C because the spring 24 and the flat surface of the pin 23b are caused to abut against each other obliquely. The engaging member 23 is returned back to the original situation shown by the solid line in FIG. 3. The side of the hole 22a formed in the receiver 22 which is closer to the cancelling cam 11 is provided with a cam portion 25. The cam portion 25 has a central projecting portion 25a which projects inwardly, and recessed portions 25b which are formed at the two sides of the projecting portion 25a. Normally, the pin 23b of the engaging member 23 abuts against the projecting portion 25a. The bracket 14 has a sliding portion 26 in which a sliding groove 27 which extends perpendicular to the line connecting the center of the pin 14a and the center of the cancelling cam 11 is provided. A recess 28 is formed substantially at the central portion of the sliding groove 27. The recess 28 has a width which is lightly larger than that of the sliding groove 27. A transfer member 29 is provided in such a manner as to be slidable on the sliding portion 26. The two ends of the transfer member 29 are provided with two projecting portions 30 and 30' which project toward the cancelling cam 11, and guide legs 31 and 31' which are directed downward. The transfer member 29 can be movable in the two directions with the guide legs 31 and 31' being guided along the sliding groove 27. However, normally a spring 32 accommodated within the recess 28 is in contact with the guide legs 31 and 31', and the transfer member 29 is thereby located at the central portion of the sliding groove which acts as a neutral position.

The above-described cancelling mechanism is operated in the manner described below.

When the operation lever 15 is located at the neutral position shown in FIG. 1, each of the click members 19 is engaged with one of the irregularities 20, and the bracket 14 and the operation lever are thereby held at the neutral position. Also, the pin 23b of the engaging member 23 is in contact with the projecting portion 25a of the cam portion 25, and the engaging member 23 is thereby located at a position furthest from the cancelling cam 11 against the resilient force of the spring 24. As a result, a forward end portion 23c of the engaging member 23 is located outside a rotational locus 11b of the projecting pieces 11a of the cancelling cam 11 which is shown by a dot-dot-dashed line. In consequence, the engaging member 23 is not affected by the rotation of the cancelling cam 11.

Figure 3:
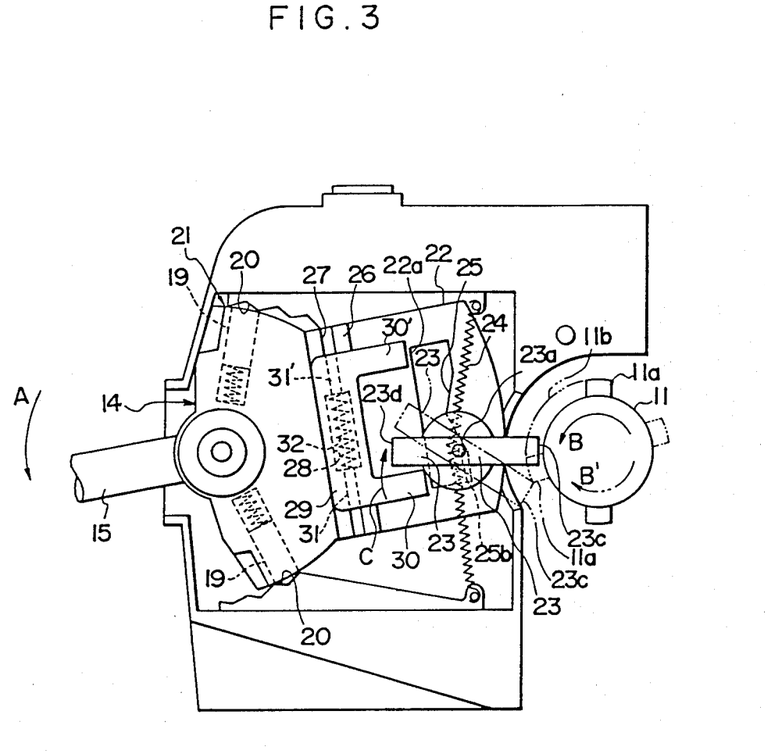
FIGS. 3 to 5 are views similar to FIG. 1, showing different states in which an operation lever is located at a left turn position.

When the operation lever 15 is rotated in the direction indicated by the arrow A from the neutral position and is thereby located at the left turn position shown in FIG. 3, each of the click members 19 is engaged with another recess of the irregularities 20, and the bracket 14 and the operation lever 15 are thereby retained at the left turn position while the projecting portion 30 of the transfer member 29 is located at a position at which it faces a proximal end portion 23d of the engaging member 23. Further, the pin 23b of the engaging member 23 makes contact with the recessed portion 25b of the cam portion 25, moving the engaging member 23 toward the cancelling cam 11 by the resilient force of the spring 24 and locating the forward end portion 23c of the engaging member 23 within the rotational locus 11b of the projecting pieces 11a of the cancelling cam 11 which is shown by the dot-dot-dashed line.

When the operation lever 15 is pivoted from the neutral position in the direction opposite from that indicated by the arrow A and is thereby located at the right turn position (not shown), each of the click members 19 is engaged with still another one of the irregularities 20, and the bracket 14 and the operation lever 15 are thereby held at the right turn position while the other projecting portion 30' of the transfer member 29 is located at a position at which it faces the proximal end portion 23d of the engaging member 23. Further, the pin 23b of the engaging member 23 makes contact with the recessed portion 25b' of the cam portion 25, thereby moving the engaging member 23 toward the cancelling cam 11 by the resilient force of the spring 24 and locating the forward end portion 23c of the engaging member 23 within the rotational locus 11b of the projecting pieces 11a of the cancelling cam 11 which is shown by the dot-dot-dashed line.

The action attained when the operation lever 15 is located to the left turn position or the right turn position is the same, so only that attained when the lever 15 is located at the left turn position will be described below.

When the cancelling cam 11 is rotated in the same direction as that of the operation of the operation lever 15, i.e., in the direction indicated by the arrow B, in a state wherein the operation lever 15 is located at the left turn position, as shown in FIG. 3, the projecting piece 11a of the cancelling cam 11 makes contact with the forward end portion 23c of the engaging member 23, pivoting the proximal end portion 23d of the engaging member 23 in the direction indicated by the arrow C in which the proximal end portion 23d is moved away from the projecting portion 30, as shown by the dot-dot-dashed line in the figure. After the projecting piece 11a has passed, the engaging member 23 returns to its initial position, and the bracket 14 and the operation lever 15 are held at the left turn position.

Figure 4:
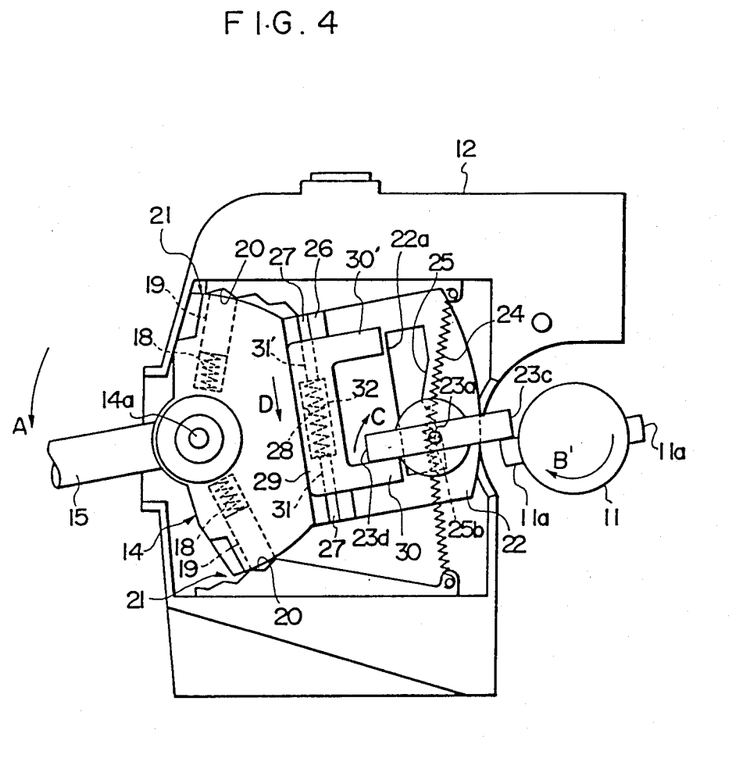

Next, when the cancelling cam 11 is rotated in the opposite direction, i.e., in the direction indicated by the arrow B', the projecting piece 11a of the cancelling cam 11 makes contact with the forward end portion 23c of the engaging member 23, as shown in FIG. 4, pivoting the proximal end portion 23d of the engaging member 23 in the direction opposite from that indicated by the arrow C. Therefore, the proximal end portion 23d engages with the projecting portion 30 and then presses it in the direction opposite from that indicated by the arrow C, urging the transfer member 29 in the direction indicated by the arrow D. However, since that urging force is applied to the bracket 14 through the spring 32, the retaining force of the click mechanism 21 is overcome, and the bracket 14 and the operation lever 15 are therefore pivoted in the direction opposite from that indicated by the arrow A and returned to the neutral position.

Figure 5:
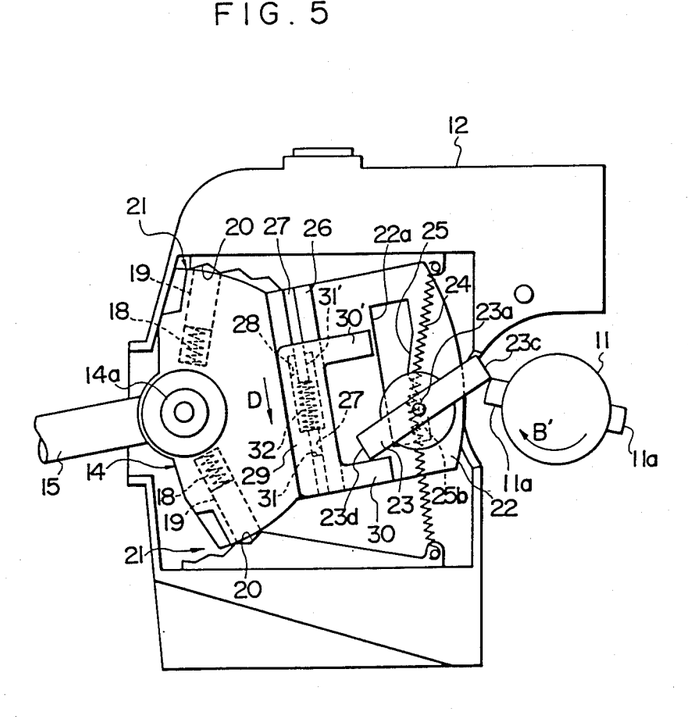

In a case where the operation lever 15 is locked by a driver in the state shown in FIG. 4, the bracket 14 is fixed at that position. Therefore, when the proximal end portion 23d of the engaging member 23 is pivoted in the direction opposite from that indicated by the arrow C, as shown in FIG. 5, the transfer member 29 is moved further in the direction indicated by the arrow D than in the case shown in FIG. 4 through the projecting portion 30. More specifically, the guide leg 31' which has been sliding along the sliding groove 27 enters the recess 28, causes the spring 32 to contract, and moves it in the direction indicated by the arrow D. After the forward end of the projecting piece 11a has passed the forward end portion 23c of the engaging member 23, the transfer member 29 is returned to its neutral portion by the restoring force of the spring 32.

This embodiment has a following advantage: the transfer member 29 is movably mounted on the bracket 14 and the transfer member 29 is retained at the neutral position by the spring 32. Therefore, it is not necessary for the projecting portions 30 and 30' that engage with the engaging member 23 to be made of an elastically deformable material. In consequence, no repeated stresses are generated in the projecting portions, and softening of the projecting portions caused by high temperature and change thereof with time can be eliminated, enabling durability of the cancelling mechanism to be improved, unlike the case of a known cancelling mechanism which employs engaging arms 6.

As will be understood from the foregoing description, in the present invention, the engaging member 23 is mounted on the bracket 14. The engaging member 23 has a forward end portion which is located within the rotational locus of the cancelling cam 11 when the bracket is pivoted from the neutral position to the right turn position or the left turn position. Further, the transfer member 29 is movably mounted on the bracket 14. The transfer member has the projecting portions 30 and 30' at the two ends thereof. When the cancelling cam 11 is rotated in the same direction as that in which the bracket 14 is pivoted in the state wherein the bracket is located at the right turn position or the left turn position, the proximal end 23d of the engaging member 23 is pivoted between the projecting portions 30 and 30'. When the cancelling cam 11 is rotated in the opposite direction, the proximal end 23d of the engaging member 23 is made engaged with either of the projecting portions 30 or 30' of the transfer member 29. The transfer member 29 is normally retained at the neutral position by the spring 32. The spring 32 also has the function of transferring the moving force of the transfer member 29 to the bracket 14 when either of the projecting portions 30 or 30' is engaged with the proximal end portion 23d of the engaging member 23 so as to return the bracket 14 to the neutral position. In consequence, the durability of the cancelling mechanism is improved.

What is claimed is:

1. A cancelling mechanism for a turning signal, comprising:

a cancelling cam to be pivotally mounted and pivoted by the rotation of a steering shaft;

a base to be mounted adjacent to said cancelling cam;

a bracket which is pivotally mounted to said base, which is pivoted by an operation lever between a neutral position and a right turn position or a left turn position;

a click mechanism for retaining said bracket with respect to said base at said neutral position, said right turn position, and said left turn position;

an engaging member pivotally supported on said bracket by means for displacing said engaging member, so that a first portion of said engaging member is displaced to a position within a rotational locus of said cancelling cam when said bracket is pivoted from said neutral position to said right turn position or to said left turn position and said first portion is maintained out of said rotational locus when said bracket is in said neutral position;

a transfer member movably supported on said bracket between the pivot of said bracket to said base and said means for displacing said engaging member, by slide means allowing said transfer member to move substantially linearly along a direction other than a line defined by the pivot of said bracket to said base and the center of rotation of said cancelling cam, said transfer member having a pair of projecting portions which extend toward said engaging member such that they are located at two sides of a second portion of said engaging member, so that when said cancelling cam is rotated in the same direction as the rotational direction in which said bracket is operated to locate said bracket at said right turn position or said left turn position, said second portion of said engaging member is pivoted between said projecting portions; while, when said cancelling cam is rotated in the opposite direction, said second portion of said engaging member engages with one of said pair of projecting portions to slide said transfer member; and an elastic member disposed between said transfer member and said bracket acting along said slide means so as to normally retain said transfer member at a neutral position, said elastic member being adapted to transfer a force generated when said second portion of said engaging member engages with either one of said pair of projecting portions of said transfer member, from said transfer member to said bracket to thereby return said bracket to said neutral position.

2. A cancelling mechanism for a turning signal according to claim 1, wherein said engaging member comprises a bar-shaped member, and said first portion comprises a longitudinal one end portion of said bar-shaped member while said second portion comprises the other end portion thereof.

3. A cancelling mechanism for a turning signal according to claim 2, wherein said bar-shaped member is rotatable by said means for displacing said engaging member, about the longitudinal central portion thereof, and is movable in the direction that said first portion is displaced toward said cancelling cam.

4. A cancelling mechanism for a turning signal according to claim 3, wherein said first portion of said bar-shaped member is normally urged toward said cancelling cam by a bias means acting between said base and said bar-shaped member.

5. A cancelling mechanism for a turning signal according to claim 1, wherein said transfer member is movable in the direction substantially perpendicular to the line which connects the to said base pivot of said bracket and the center of rotation of said cancelling cam.

6. A cancelling mechanism for a turning signal according to claim 1, wherein said transfer member has a substantially U-shaped from, and said projecting portions comprise leg portions of said U-shape.

7. A cancelling mechanism for a turning signal according to claim 1, wherein said means for displacing said engaging member comprises a portion of said engaging member and a hole formed with guide surfaces in said bracket, wherein said portion is accommodated within said hole and said engaging member is moved in and out of said rotational locus of said canceling cam by one of said guide surfaces when said bracket is pivoted.

8. A cancelling mechanism for a turning signal according to claim 1, wherein said elastic member is disposed in recesses formed along said slide means in opposite surfaces of said bracket and said transfer member, and the urging force threof acts in the direction in which relative movement between said bracket and said transfer member is prevented by said second portion of said engaging member.

9. A cancelling mechanism for a turning signal according to claim 8, wherein said elastic member comprises a coil spring.

10. A cancelling mechanism for a turning signal for automatically returning to a neutral position an operation lever which has been operated to a right turn position or a left turn position in order to indicate the turning direction of a vehicle by the rotation of a steering shaft in the direction opposite from that in which said operation lever is rotated, comprising:

a cancelling cam disposed around said steering shaft, said cancelling cam being rotated by the rotation of said steering shaft;

a base non-rotatably mounted adjacent to said cancelling cam;

a bracket pivotally mounted to said base for supporting said operation lever, said bracket being pivoted by said operation lever from said neutral position to said right turn position or said left turn position;

a click mechanism for retaining said bracket with respect to said base at said neutral position, said right turn position or said left turn position;

a bar-shaped engaging member pivotally supported by said bracket by means for disposing said engaging member, so that one end portion of said engaging member is displaced to a position within a rotational locus of said cancelling cam when said bracket is pivoted from said neutral position to said right turn position or said left turn position and said one end portion is maintained out of said rotational locus when said bracket is in said neutral position;

a transfer member movably supported on said bracket between the pivot of said bracket to said base and said means for displacing said engaging member, by slide means allowing said transfer member to move substantially linearly along a direction other than a line defined by the pivot of said bracket to said base and the center of rotation of said cancelling cam, said transfer member having a pair of projecting portions which extend toward said engaging member such that they are located at two sides of another end portion of said engaging member, so that when said cancelling cam is rotated in the same direction as that rotational direction in which said bracket is operated to locate said bracket at said right turn position or said left turn position, said another end portion of said engaging member is pivoted between said projecting portions, while, when said cancelling cam is rotated in the opposite direction, and another end portion of said engaging member engages with one of said pair of projecting portions to slide said transfer member; and an elastic member disposed between said transfer member and said bracket acting along said slide means so as to normally retain said transfer member at a neutral position, said elastic member being adapted to transfer a force generated when said another end portion of said engaging member engages with either one of said pair of projecting portions of said transfer member, from said transfer member to said bracket to thereby return said bracket to said neutral position.

11. A cancelling mechanism for a turning signal according to claim 10, wherein said engaging member is rotatable by said means for displacing said engaging member about the longitudinal central portion thereof, and is movable in the direction that said one end portion is displaced toward said cancelling cam.

12. A cancelling mechanism for a turning signal according to claim 10, wherein said transfer member is movable in the direction substantially perpendicular to the line which connects the pivot of said bracket to said base and the center of rotation of said cancelling cam.

13. A cancelling mechanism for a turning signal according to claim 10, wherein said transfer member mechanism has a substantially U-shaped from, and said projecting portions comprise leg portions of said U-shape.

14. A cancelling mechanism for a turning signal according to claim 10, wherein said one end portion of said engaging member is normally urged in the direction in which said engaging member is moved toward said cancelling cam by a bias means acting between said base and said bar-shaped engaging member.

15. A cancelling mechanism for a turning signal according to claim 10, wherein said means for displacing said engaging member comprises a portion of said engaging member and a hole formed with guide surfaces in said bracket, wherein said portion is accommodated within said hole and said engaging member is moved in and out of said rotational locus of said cancelling cam by one of said guide surfaces when said bracket is pivoted.

16. A cancelling mechanism for a turning signal according to claim 10, wherein said elastic member is disposed in recesses formed along said slide means in opposite surfaces of said bracket and said transfer member, and the urging force thereof acts in the direction in which relative movement between said bracket and said transfer member is prevented by said another portion of said engaging member.

17. A cancelling mechanism for a turning signal according to claim 16, wherein said elastic member comprises a coil spring.

* * * * *